(12) United States Patent
Markert et al.

(10) Patent No.: US 9,785,410 B2
(45) Date of Patent: Oct. 10, 2017

(54) METHOD FOR OPERATING A CONTROL UNIT AND A CONTROL UNIT HAVING A MODEL CALCULATION UNIT

(71) Applicant: Robert Bosch GmbH, Stuttgart (DE)

(72) Inventors: Heiner Markert, Stuttgart (DE); Wolfgang Fischer, Gerlingen (DE); Nico Bannow, Stuttgart (DE); Andre Guntoro, Pforzheim (DE); Michael Hanselmann, Korntal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 621 days.

(21) Appl. No.: 14/321,306

(22) Filed: Jul. 1, 2014

(65) Prior Publication Data

US 2015/0012575 A1 Jan. 8, 2015

(30) Foreign Application Priority Data

Jul. 2, 2013 (DE) .................. 10 2013 212 842

(51) Int. Cl.
*G06F 7/60* (2006.01)
*G06F 9/38* (2006.01)
*G05B 13/04* (2006.01)

(52) U.S. Cl.
CPC ............. *G06F 7/60* (2013.01); *G05B 13/04* (2013.01); *G06F 9/3877* (2013.01)

(58) Field of Classification Search
CPC ........................................................ G06F 7/60
USPC .......................................................... 700/275
See application file for complete search history.

(56) References Cited

U.S. PATENT DOCUMENTS

| 4,675,809 A | 6/1987 | Omoda et al. |
| 5,161,117 A | 11/1992 | Waggener, Jr. |
| 5,619,702 A | 4/1997 | Ilic |
| 6,256,724 B1* | 7/2001 | Hocevar ............ G06F 9/3897 711/112 |
| 2005/0102488 A1 | 5/2005 | Bullis |
| 2009/0063805 A1* | 3/2009 | Xu ...................... G06F 11/3664 711/170 |

(Continued)

FOREIGN PATENT DOCUMENTS

DE    10 2010 028266    10/2011

*Primary Examiner* — Andrew Caldwell
*Assistant Examiner* — Michael Metzger
(74) *Attorney, Agent, or Firm* — Norton Rose Fulbright US LLP; Gerard Messina

(57) ABSTRACT

A method for operating a control unit, the control unit including a software-controlled main processing unit, a strictly hardware-based model calculation unit for calculating an algorithm, for carrying out a Bayesian regression method, based on configuration data, and a memory unit, a model memory area being defined in the memory unit to which a configuration register block for providing the configuration data in the model calculation unit is assigned, a calculation start-configuration register being assigned the highest address in the configuration register block into which configuration data are written, the writing into of which starts the calculation in the model calculation unit, the configuration data being written in a memory area of the memory unit from the model memory area into the configuration register block with an incremental copying process, the addresses being copied in the incremental copying process in ascending order.

15 Claims, 3 Drawing Sheets

(56) References Cited

U.S. PATENT DOCUMENTS

2009/0113218 A1* 4/2009 Dolgunov ............... G06F 13/28
 713/190
2011/0282517 A1* 11/2011 Streichert ............... F02D 41/28
 701/1

* cited by examiner

METHOD FOR OPERATING A CONTROL UNIT AND A CONTROL UNIT HAVING A MODEL CALCULATION UNIT

RELATED APPLICATION INFORMATION

The present application claims priority to and the benefit of German patent application no. 10 2013 212 842.8, which was filed in Germany on Jul. 2, 2013, the disclosure of which is incorporated herein by reference.

FIELD OF THE INVENTION

The present invention relates in general to control units for controlling physical units, in particular control units including a software-controlled processing unit and a hardware-based model calculation unit. The present invention also relates to a method for controlling the model calculation unit using the processing unit.

BACKGROUND INFORMATION

To calculate control path or system models, control units may be provided with strictly hardware-based logic units which represent model calculation units for calculating model function values. This is useful, in particular, if the calculations of control path or system models are complicated, as is the case, for example, in data-based function models, in particular in the form of Gaussian process models, due to complex mathematical functions and loop calculations.

The model calculation units may be initialized for a calculation, may carry out the calculation, may be set in sleep mode and may be switched off, in particular, with the aid of suitable interfaces with the software-driven main processing unit (microcontroller) situated in the system. The configuration data for such a model calculation unit describing the function model and required for the calculation may be transmitted into a series of configuration registers which are normally associated with a particular contiguous memory area of an internal memory of the control unit. To start a calculation in the model calculation unit it is generally provided that a particular configuration register of the configuration registers is written into in order to start the computation process, whereby it may be provided that the type of data written into the configuration register is not relevant.

The publication US 2005/0102488 A1 discusses a language for programming a firmware register.

In addition, the publication U.S. Pat. No. 5,619,702 concerns the use of a database which defines each hardware register and assigns the bits to the hardware register.

SUMMARY OF THE INVENTION

Provided according to the present invention are the method for operating a control unit as described herein and the control unit as described herein.

Additional advantageous embodiments of the present invention are specified in the further descriptions herein.

According to a first aspect, a method for operating a control unit is provided, the control unit including a software-controlled main processor unit, a strictly hardware-based model calculation unit for calculating an algorithm, in particular for carrying out a Bayesian regression method based on configuration data, and a memory unit, a model memory area being defined in the memory unit to which a configuration register block is assigned for providing the configuration data in the model calculation unit, a calculation start-configuration register being assigned a highest address in the configuration register block into which the configuration data are written, the writing of which starts the calculation in the model calculation unit, the configuration data being written from the model memory area into the configuration register block in a memory area of the memory unit with the aid of an incremental copying process, the addresses being copied in ascending order during the incremental copying process.

In control units which include a software-controlled control unit and a model calculation unit implemented in hardware, and in which to relieve the control unit, function models, in particular data-based function models, are calculated in the separate model calculation unit, control of the model calculation unit and the definition of the model function are carried out via configuration registers. The configuration registers are used to deliver start values to the model calculation unit for the algorithm for calculating a function value, and further to define the address ranges in which parameters for parametric function models or hyperparameters and node data for the calculation of the nonparametric, data-based function model are stored. The task of the software-controlled main processing unit of predefining the configuration data with the aid of the model calculation unit prior to each function value calculation of the data-based function model, and of starting the calculation process, may represent a not insignificant burden in the case of inefficient main processing units.

To relieve the main processing unit, it may therefore be provided that the configuration register which starts the calculation process in the model calculation unit is written into as the last of the configuration registers in the configuration register block. For this purpose, the configuration registers may be assigned to a contiguous memory area of the internal memory, the model memory area, so that they are transferred from the model memory area in which the configuration data for the model calculation unit are stored to the configuration register block of the model calculation unit by a simple incremental memory copying process, in particular by using a block copying function known per se of a DMA unit. The particular configuration register which starts the calculation process is in this configuration provided as the highest memory address of the contiguous memory area, and is therefore the last written into by the incremental memory copying process. In this way, the calculation may be started immediately upon conclusion of the simple incremental memory copying process, and the initial data required for the start of the calculation may be accessed. A separate writing into the particular configuration register after the writing in of the configuration data may therefore be omitted. This method is advantageous, in particular when using a DMA unit which may take over the writing process in the configuration register block, since the processing unit is fully relieved as a result.

It may be provided that the incremental copying process exhibits a granularity, an unused memory area being connected to the memory address assigned to the calculation start-configuration register when the granularity is greater than the model memory area.

The DMA unit may be instructed by the main processing unit to carry out multiple successive block copying functions.

It may be provided that according to the instruction of the DMA unit to carry out multiple, successive block copying functions, multiple calculations are carried out in the model calculation unit, a second DMA unit copying the calculation result after each calculation started by the multiple block copying process, and the first DMA unit instructing the next block copying process to be carried out.

According to another aspect, a control unit for operating a physical unit is provided, including:

a software-controlled main processing unit;

a strictly hardware-based model calculation unit for calculating an algorithm, in particular for carrying out a Bayesian regression method, based on configuration data; and a memory unit for storing the configuration data, a model memory area being defined in the memory unit to which a configuration register block is assigned for providing the configuration data in the model calculation unit, a calculation start-configuration register being assigned a highest address in the configuration register block; the model calculation unit being configured to start a calculation of the algorithm when the calculation start-configuration register is written into.

A first DMA unit may also be provided in order to carry out the accessing and reading out of the model memory area with the aid of a block copying process.

The main processing unit may start the function of the first DMA unit and may be configured to prompt the first DMA unit to carry out a multiple block copying process, after which multiple calculations may be carried out in succession in the model calculation unit.

Specific embodiments of the present invention are explained in greater detail below with reference to the attached drawings.

DETAILED DESCRIPTION

Figure 1:
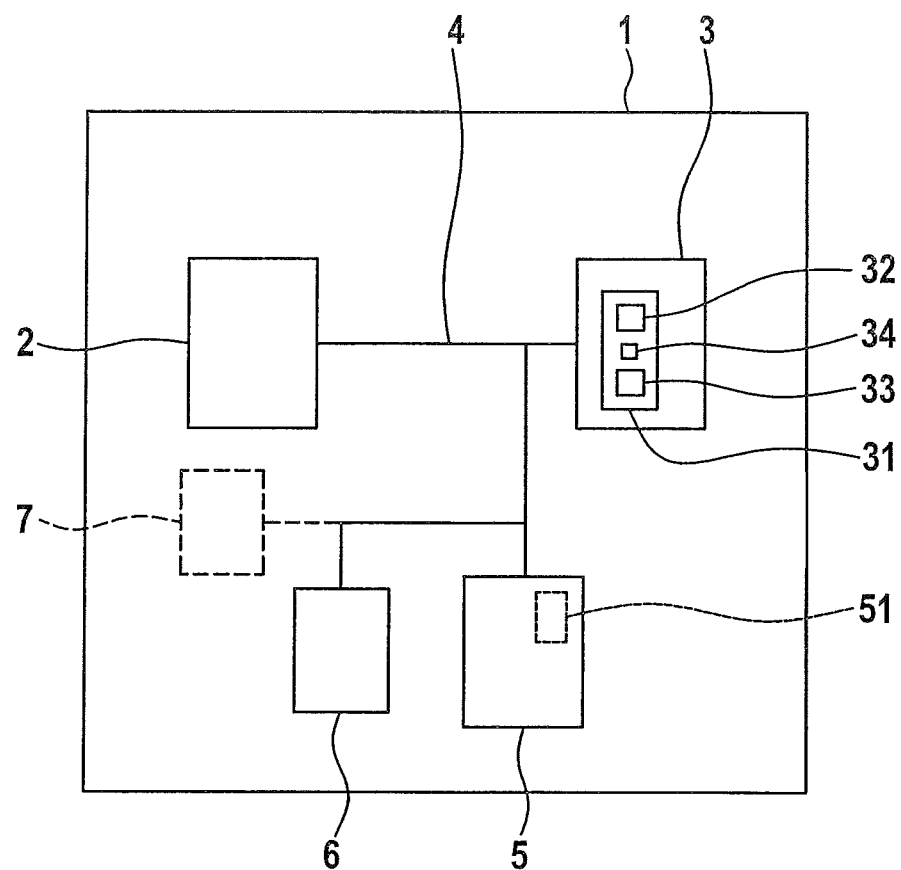
FIG. 1 shows a schematic representation of a control unit including a software controlled main processing unit and a model calculation unit implemented in hardware.

FIG. 1 schematically shows the design of a control unit 1, in particular for operating a physical unit, such as, for example, an internal combustion engine, in a motor vehicle. Control unit 1 includes a microcontroller as main processing unit 2, which together with a model calculation unit 3 is integrally configured. Model calculation unit 3 is essentially a hardware unit which is able to carry out hardware-based function calculations, in particular those for a Bayesian regression method. In particular, the model calculation unit is configured to carry out exponential function, addition and multiplication operations in loop calculations.

Calculations in model calculation unit 3 are started by main processing unit 2 in order to ascertain a function value for a test point for descriptive hyperparameters and node data based on the function model. The hyperparameters and node data are stored in a memory unit 5 also integrated into main processing unit 2 and model calculation unit 3, and are used to represent a data-based function model describing the operation of a physical unit to be controlled.

Main processing unit 2 and model calculation unit 3 communicate with one another via an internal communication link, in particular, a system bus 4. In addition, a memory unit 5 and a DMA unit 6 (DMA=direct memory access) may be connected to the internal communication link in order to ensure a signal communication with main processing unit 2 and model calculation unit 3.

Model calculation unit 3 basically includes hardware only (hardwiring), which predefines a fixed calculation sequence and need not be configured to execute software code. For this reason, it is also not necessary to provide a processor in model calculation unit 3. This makes possible a resource-optimized implementation of such a model calculation unit 3. As a result of the calculation according to an implemented hardware routine, it is possible to significantly reduce the calculation time as compared to a software algorithm.

The use of nonparametric, data-based function models is based on a Bayesian regression method. The principles of Bayesian regression are described, for example, in C. E. Rasmussen, et al., "Gaussian Processes for Machine Learning," MIT Press 2006. Bayesian regression is a data-based method which is based on a model. Creating the model requires measuring points from training data and associated output data of an output variable. The model is created by using node data which correspond fully or in part to the training data or are generated from these. In addition, abstract hyperparameters are determined which parameterize the space of the model functions and effectively weight the influence of the individual measuring points of the training data on the subsequent model prediction.

Model calculation unit 3 is configured to access a configuration register block 31 having configuration registers 32. In particular, model calculation unit 3 may be configured to integrate configuration register block 31 having configuration registers 32 into the memory area of the system, or to represent them as memory-mapped registers.

Configuration registers 32 of configuration register block 31 are configured to receive the parameters and address pointers necessary for calculating the function model. Data, in particular address pointers above all are required, which indicate with the aid of a start pointer and, if necessary, a length of the data, the address range in which the hyperparameters and the node data for calculating the function model are situated. In addition, the initialization values for the loops to be calculated may be predefined, as well as an offset value, based on which the function value of the data-based function model is calculated. The transfer of additional parameters is possible.

To start a calculation of a function model in model calculation unit 3, main processing unit 2 must initially configure configuration registers 32 and subsequently start model calculation unit 3 by writing into a particular calculation start-configuration register 33, with or without configuration of the bits contained therein.

Figure 2:
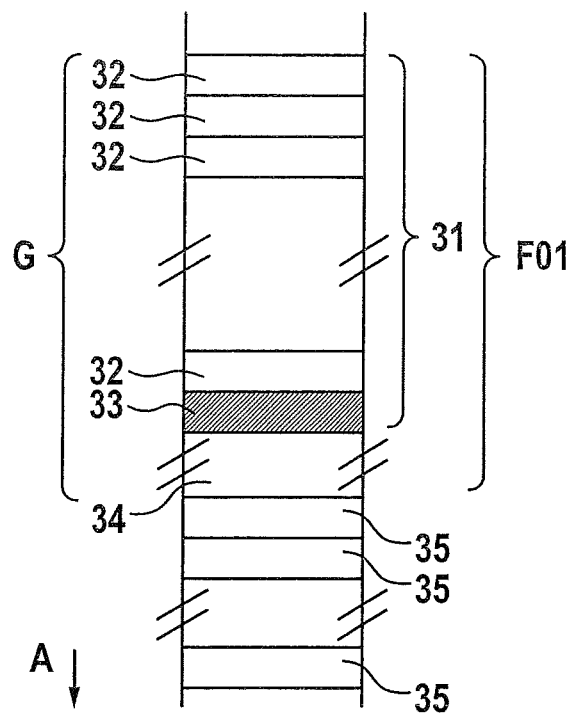
FIG. 2 shows a memory area of the internal memory to which the model calculation unit is assigned and to which the configuration registers are assigned.

Writing into configuration registers 32 and starting model calculation unit 3 has previously depended entirely on main processing unit 2, which as a result is burdened significantly, in particular in the case of multiple, consecutively occurring shorter-term calculations. It is therefore provided to design configuration register block 31 as shown in FIG. 2. It is apparent that configuration register block 31 includes a series of configuration registers 32 and calculation start-configuration register 33 is provided at the highest memory address, so that the configuration data are written in a consecutive writing process (writing with incrementing memory address) into configuration register block 31. Thus, the address which is assigned to calculation start-configuration register 33 is written into last. In this way, an incremental memory copy instruction may be used in main processing unit 2 which represents a reduced burden for the main processing unit 2.

Moreover, this task may also be transferred from main processing unit 2 to DMA unit 6. Normally, DMA units exhibit a certain granularity so that the size of the transferred data blocks is fixed. However, calculation start-configuration register 33 is always situated at the memory address which follows immediately upon the memory addresses assigned to remaining configuration registers 32. If granularity G of DMA unit 6 is higher, then the remaining memory addresses which connect to the memory address for calculation start-configuration register 33 are marked or reserved as unused memory area 34.

It may also be provided that only readable registers 35 are configured to provide the result, the status, and additional information to model calculation unit 3.

In order to provide that DMA unit 6 configures model calculation unit 3, it is necessary to define a structure which contains multiple programming models F01, F02, ..., F0M.

Figure 3:
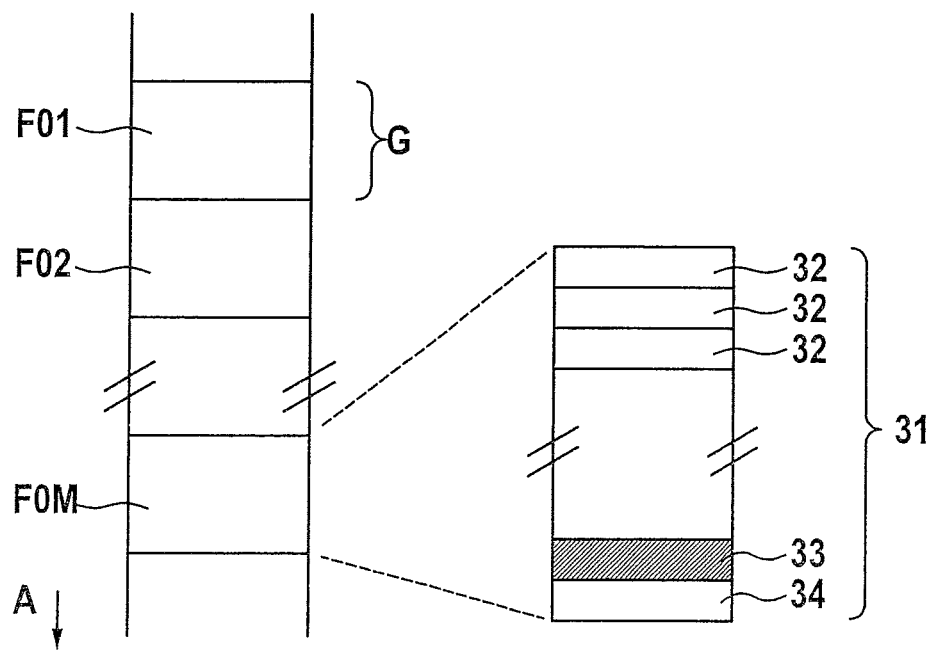
FIG. 3 shows a memory area of the memory unit including multiple programming models.

In FIG. 3, M program models F01, F02, ..., F0M are stored in succession corresponding to DMA granularity G on model memory area 51. Each programming model contains the configuration parameters which are written into configuration register 32 and calculation start-configuration register 33. In addition, the programming model may contain the reserved memory addresses of unused memory area 34, as described above.

When using a DMA unit 6, the task of main processing unit 2 is merely to configure DMA unit 6 and to start this unit with the address information which is determined by the start address of the configuration data in model memory area 51 and the destination address indicated by the base address of configuration register block 31 for model calculation unit 3.

Figure 4:
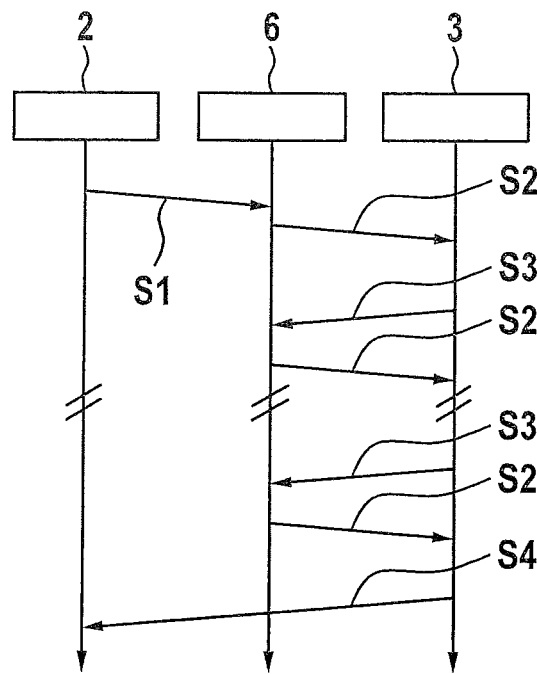
FIG. 4 shows a flow chart for illustrating a method for starting a model calculation with multiple function models to be calculated in the model calculation unit of FIG. 1.
Figure 5:
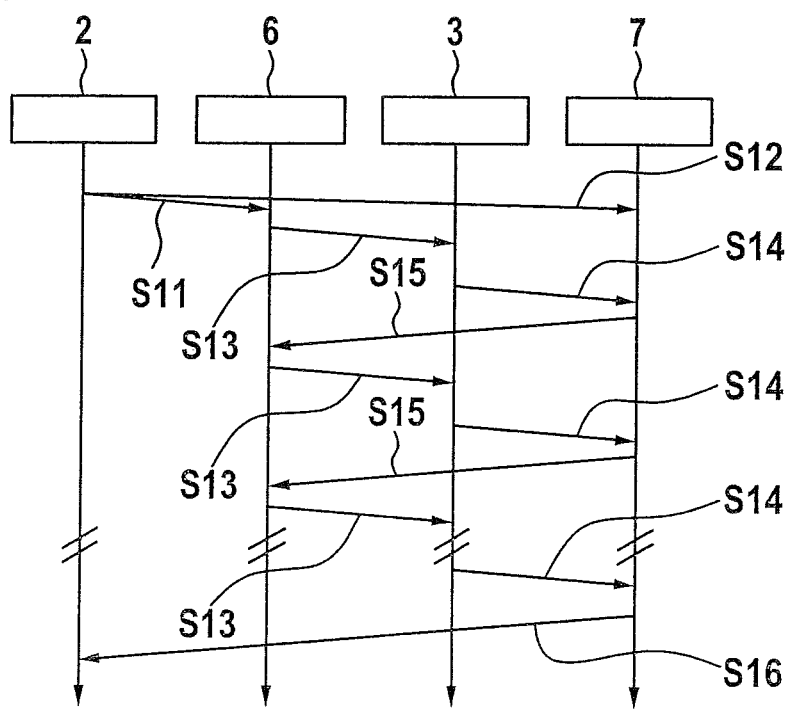
FIG. 5 shows a flow chart for illustrating a method for starting a model calculation with multiple function models to be calculated in a model calculation unit having two DMA units.

In a method which is schematically shown in FIG. 4, model calculation unit 3 may be configured and started consecutively with various programming models F01, F02, ... F0M. DMA unit 6 should support repeatable block copying processes with the same destination base address. For this purpose, main processing unit 2 will output in a step S1 a corresponding one-time instruction to DMA unit 6. In step S2 DMA unit 6 starts the calculation process via a one-time block copying process in configuration register block 31. After each calculation, calculation unit 3 signals DMA unit 6 in step S3, for example, with the aid of an interrupt, that the calculation has ended. This process of steps S2 and S3 is carried out for each programming model F01, F02, ..., F0M to be calculated. Once the calculation of the last programming model F0M to be calculated is ended, instead of step S3, a corresponding message is sent in step S4 to main processing unit 2.

This method may also be implemented with the aid of a second DMA unit 7 in order to copy the calculation results to the other memory address. Second DMA unit 7 must also support repeatable copying processes with the same source base address without any input from main processing unit 2.

In addition, main processing unit 2 configures both DMA units 6, 7 in steps S11 and S12. In step S13, first DMA unit 6 starts the calculation process via a block copying process in model calculation unit 3. Once each calculation is ended, model calculation unit 3 signals in step S14 as much to second DMA unit 7. Second DMA unit 7 is triggered by the interrupt from model calculation unit 3.

Second DMA unit 7 is used after each calculation to transmit the calculation results of model calculation unit 3 to another memory address and in step S15 to prompt first DMA unit 6.

Subsequently, a reconfiguration of model calculation unit 3 and the start of calculation take place in step S13 via a block copying process for writing the configuration data into configuration register block 31. Once each calculation is ended, model calculation unit 3 signals as much in step S14 to second DMA unit 7 and in step S15 first DMA unit 6 is triggered again.

Upon conclusion of the final calculation, the end of the calculations may be communicated in a step S16 to main processing unit 2, depending on the characteristics of second DMA unit 7. This may be carried out by the generation of an interrupt of second DMA unit 7, which is either forwarded directly to main processing unit 2 or to first DMA unit 6, which then forwards the interrupt to main processing unit 2.

All programming models F01, F02, ..., F0M establish the interrupt generation to second DMA unit 7 with the aid of the configuration data and second DMA unit 7 generates the interrupt for first DMA unit 6 after the end of the calculations of a function model in model calculation unit 3 in accordance with a programming model.

What is claimed is:

1. A method for operating a control unit for calculating an algorithm, the method comprising:
   defining a model memory area in a memory unit to which a configuration register block for providing configuration data in a strictly hardware-based model calculation unit is assigned, wherein the control unit includes a software-controlled main processing unit, the memory unit, and the strictly hardware-based model calculation unit for calculating an algorithm based on configuration data; and
   assigning a calculation start-configuration register a highest address in the configuration register block into which configuration data is written, the writing of which starts the calculation in the model calculation unit, the configuration data being written in a memory area of the memory unit from the model memory area into the configuration register block with an incremental copying process, the addresses being copied in the incremental copying process in sequential order.

2. The method of claim 1, wherein the incremental copying process is carried out with the aid of a block copying function of a DMA unit.

3. The method of claim 2, wherein the incremental copying process exhibits a granularity, an unused memory area being connected to the memory address assigned to the calculation start-configuration register, to fit the granularity of the DMA unit.

4. The method of claim 2, wherein the DMA unit is instructed by the main processing unit to carry out multiple successive block copying functions having a same destination base address.

5. The method of claim 4, wherein in accordance with the instruction of the DMA unit to carry out multiple successive block copying functions, multiple calculations are carried out in the model calculation unit, and wherein a second DMA unit copies the calculation result after each calculation started by the multiple block copying process and instructing the first DMA unit to carry out the next block copying process to be carried out.

6. The method of claim 1, wherein the algorithm includes carrying out a Bayesian regression method.

7. The method of claim 1, wherein the sequential order is an ascending order.

8. A control unit for operating a physical unit, comprising:
a software-controlled main processing unit;
a strictly hardware-based model calculation unit for calculating an algorithm, for carrying out a Bayesian regression method, based on configuration data; and
a memory unit for storing the configuration data, a model memory area being defined in the memory unit to which a configuration register block is assigned for providing the configuration data in the model calculation unit, a calculation start-configuration register being assigned a highest address in the configuration register block;
wherein the model calculation unit is configured to start a calculation of the algorithm when the calculation start-configuration register is written into.

9. The control unit of claim 8, further comprising:
a first DMA unit to carry out the writing into the configuration register block with a block copying process.

10. The control unit of claim 9, wherein the main processing unit starts the function of the first DMA unit.

11. The control unit of claim 9, wherein the main processing unit is configured to prompt the first DMA unit to carry out a multiple block copying process, after which multiple successive calculations are carried out in the model calculation unit.

12. The control unit of claim 11, further comprising:
a second DMA unit to copy the calculation result after each calculation started by the multiple block copying process and to instruct the first DMA unit to carry out the next block copying process.

13. A non-transitory computer readable medium having a computer program, which is executable by a processor, comprising:
a program code arrangement having program code for operating a control unit for calculating an algorithm, by performing the following:
defining a model memory area in a memory unit to which a configuration register block for providing configuration data in a strictly hardware-based model calculation unit is assigned, wherein the control unit includes a software-controlled main processing unit, the memory unit, and the strictly hardware-based model calculation unit for calculating an algorithm based on configuration data; and
assigning a calculation start-configuration register a highest address in the configuration register block into which configuration data is written, the writing of which starts the calculation in the model calculation unit, the configuration data being written in a memory area of the memory unit from the model memory area into the configuration register block with an incremental copying process, the addresses being copied in the incremental copying process in sequential order.

14. The computer readable medium of claim 13, wherein the algorithm includes carrying out a Bayesian regression method.

15. The computer readable medium of claim 13, wherein the sequential order is an ascending order.

* * * * *